(12) United States Patent
Wolf et al.

(10) Patent No.: US 8,253,379 B2
(45) Date of Patent: Aug. 28, 2012

(54) CHARGE CIRCUIT FOR BATTERY CELLS

(75) Inventors: Michael Wolf, Kornwestheim (DE); Marcus Bremmer, Benningen am Neckar (DE)

(73) Assignee: Robert Bosch GmbH, Stuttgart (DE)

( * ) Notice: Subject to any disclaimer, the term of this patent is extended or adjusted under 35 U.S.C. 154(b) by 220 days.

(21) Appl. No.: 12/308,585

(22) PCT Filed: May 23, 2007

(86) PCT No.: PCT/EP2007/054992
§ 371 (c)(1),
(2), (4) Date: Jun. 28, 2011

(87) PCT Pub. No.: WO2008/009502
PCT Pub. Date: Jan. 24, 2008

(65) Prior Publication Data
US 2011/0254499 A1 Oct. 20, 2011

(30) Foreign Application Priority Data
Jul. 18, 2006 (DE) .......................... 10 2006 033 171

(51) Int. Cl.
*H01M 10/44* (2006.01)
*H01M 10/46* (2006.01)

(52) U.S. Cl. ....................................................... 320/122
(58) Field of Classification Search ................. 320/107, 320/116, 117, 118, 119, 120, 122
See application file for complete search history.

(56) References Cited

U.S. PATENT DOCUMENTS

| | | | |
|---|---|---|---|
| 5,578,914 A * | 11/1996 | Morita | 320/122 |
| 5,998,967 A | 12/1999 | Umeki et al. | |
| 6,121,752 A | 9/2000 | Kitahara et al. | |
| 6,271,648 B1 | 8/2001 | Miller | |
| 6,329,792 B1 | 12/2001 | Dunn et al. | |
| 7,471,065 B2 * | 12/2008 | Emori et al. | 320/116 |
| 2006/0139004 A1 * | 6/2006 | Uesugi et al. | 320/132 |

FOREIGN PATENT DOCUMENTS

| | | |
|---|---|---|
| DE | 101 50 376 | 4/2003 |
| EP | 0 498 679 | 8/1992 |
| EP | 1 056 182 | 11/2000 |

* cited by examiner

*Primary Examiner* — Edward Tso
(74) *Attorney, Agent, or Firm* — Kenyon & Kenyon LLP

(57) ABSTRACT

A device for charging a battery system having a number of individual voltage sources situated in a series circuit is provided, which device uses a voltage source and a respective bypass associated with each of the individual voltage sources. A charge current $I_L$ is supplied from the voltage source via the bypasses to the individual voltage sources as a function of their charge condition.

12 Claims, 1 Drawing Sheet

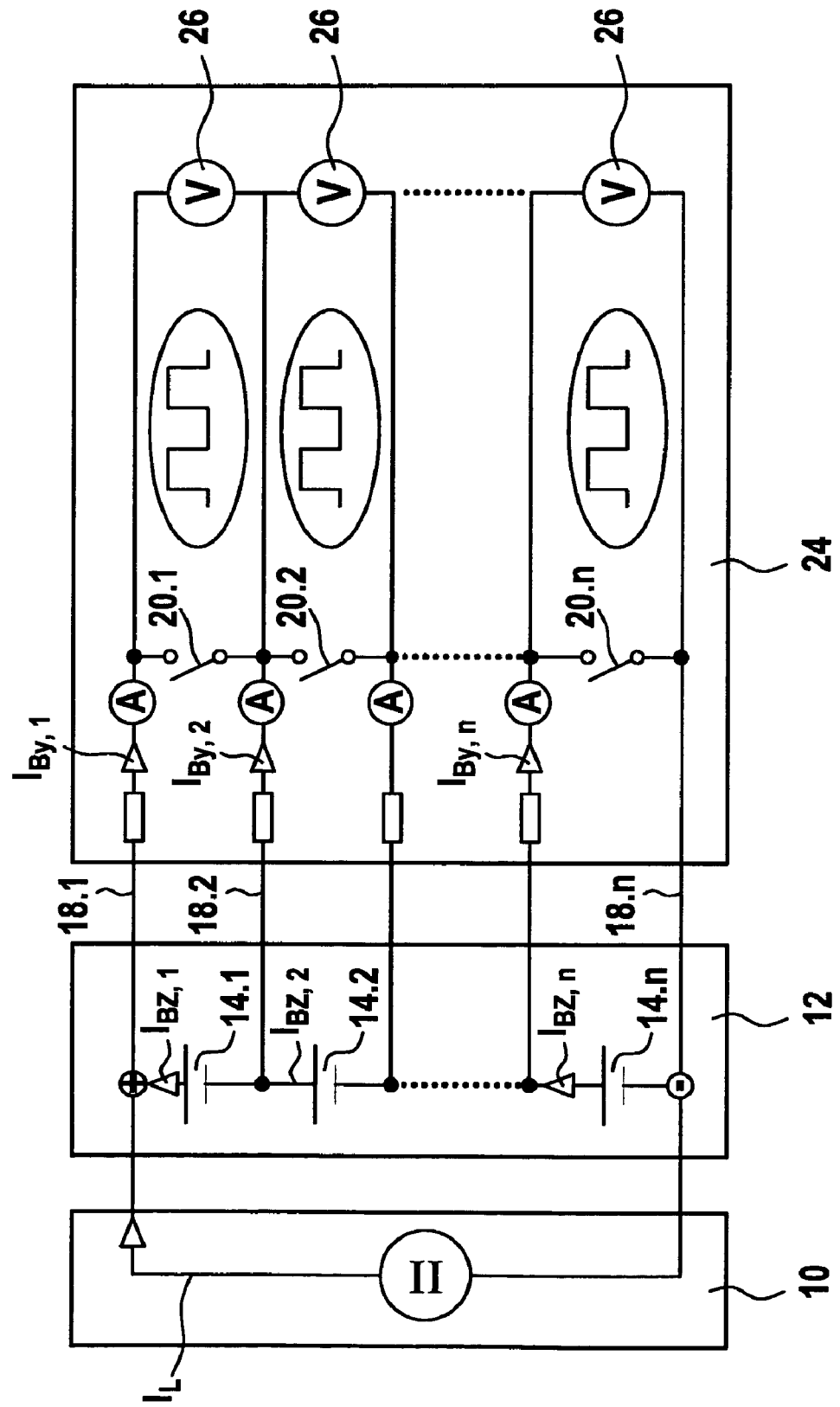

CHARGE CIRCUIT FOR BATTERY CELLS

BACKGROUND OF THE INVENTION

1. Field of the Invention

The present invention relates to a method and a device for charging a battery system having a plurality of voltage sources.

2. Description of Related Art

Published German patent document DE 101 50 376 describes a device for equalizing the charge condition of accumulators connected in series. According to this approach, a capacitor is provided, as well as a plurality of switches situated between the capacitor and the accumulators. Furthermore, the device has a logic which is used for measuring the voltages applied to the accumulators and, when a predefined differential threshold value between the voltages applied to the accumulators is exceeded, for activating a driver controlling the switches. The capacitor is connectable for the purpose of a charge exchange alternatingly with the individual accumulators via the switches. In addition, the device known from published German patent document DE 101 50 376 has two accumulators connected in series and four switches. A first of the switches is situated between a first terminal of the capacitor and the terminal of the accumulators connected in series, farther away from the ground, a second of the switches is situated between the second terminal of the capacitor and ground, a third of the switches is situated between the second terminal of the capacitor and the point of connection between the two accumulators, and a fourth of the switches is situated between the first terminal of the capacitor and the point of connection between the two accumulators.

If a plurality of battery cells is connected in series in order to increase the output voltage of the battery system, the voltage across the individual cells is established, among other things, as a function of their "health condition" or of the prevailing internal resistance, in addition to other influencing factors when the battery system is charged. If battery cells which are sensitive to overvoltages are used, the charging operation of the battery system is terminated when the maximum allowable cell voltage is attained at one of the individual cells connected in series.

The more homogeneously the individual cells are able to be charged, the higher the service life of the battery system. Since, during the charging operation, there is inhomogeneity within the individual cells of the battery system, in which the maximum allowable cell voltage value is attained before other individual cells attain this value, the charging operation is switched off, although some of the cells are not yet fully charged. On discharging, the not fully charged individual cells initially attain a predefined lower voltage value and the discharging operation is terminated, although individual cells in the battery system which are capable of outputting their charge are still available. This effect of inhomogeneity may become reinforced over the operating time and as a function of the number of charging and discharging cycles to which the battery system is subjected. The greater the inhomogeneity, the smaller is the difference between available and chargeable energy. Due to the above-described effect, the battery system is no longer able to be used effectively and must therefore be replaced. In general, this effect of inhomogeneity is counteracted by a careful selection of the individual cells having identical characteristics for serial circuits in a battery system, and by using a charge transfer in which a charge is transferred from individual cells which are in a better condition to individual cells which are in a worse condition via transformer circuits. In contrast, the selection of the individual cells represents a relatively high degree of complexity. Transformers, which were previously used for this purpose, require a large installation space and are expensive. Furthermore, removal of heat during the homogenization operation requires expending a considerable effort.

BRIEF SUMMARY OF THE INVENTION

An object of the present invention is to increase the service life of a battery system by keeping the individual cells in a homogeneous charge range among them.

An energy source for obtaining a more homogeneous charge distribution which is available on the system side and is connected to the battery system from the outside is used for charging the battery system. No transformers are needed for transporting the charge to the individual cells of the battery system; the selection of the individual cells of the battery system may be determined in a larger bandwidth.

The more homogeneous charge distribution within the battery system is achieved by adding a bypass for each individual cell of the battery system. Either at least one resistor or at least one inductor may be connected in series into the bypass for current limitation.

Each bypass around each individual cell of the battery system is associated with a bypass switch for bypassing the charge current past each individual cell. The intensity of the bypass current may be regulated via a timed activation of the bypass switch in such a way that the mean current from the individual cells is approximately equal to 0, so the individual cell is not discharged when the bypass is switched on. The following equation applies to the current regulation:

$$\overline{I_{Bz}} = \overline{I_{By}} - \overline{I_L} \approx 0$$

where:
$I_{By}$=current through the individual cell bypass
$I_{Bz}$=current from an individual cell
$I_L$=charge current of the battery system To detect the value 0 of the current from an individual cell $I_{Bz}$, either the voltage of the individual cells may be monitored so that the maximum allowable limiting value is not exceeded, or a sensor may be used for each individual cell which measures or represents the current through the individual cell.

The bypasses associated with the individual cells of the battery system are activated during the charging operation of the battery system when the voltage across the particular individual cell reaches the maximum allowable voltage value. These individual cells are fully charged in this case and need no further charging. The individual cells which, in contrast, have lower charge conditions, have not yet reached their maximum allowable voltage value and may therefore receive an additional charge. The charging operation is completed when either all individual cells or a previously defined number of individual cells have reached their maximum allowable voltage value.

Charge current $I_L$ through the voltage source or current source may be limited with the aid of a smart control by the battery charge controller. The charge current limitation is activated when one or more bypasses associated with the individual cells of the battery system are activated.

BRIEF DESCRIPTION OF THE DRAWING

FIG. 1 shows a charge circuit for battery cells connected in series for homogenizing the charge distribution.

DETAILED DESCRIPTION OF THE INVENTION

The sole FIGURE, FIG. 1, embodiment of the device proposed invention for charging a battery system using a number of individual voltage sources connected in series.

It is apparent from the drawing that the charge circuit proposed according to the present invention has a voltage source 10 via which a battery system 12 is charged. Battery system 12 includes individual voltage sources 14.1, 14.2, . . . 14.n, which are situated in a series circuit 16 within battery system 12. Any number of individual voltage sources 14.1, 14.2, . . . 14.n may be situated in battery system 12. It is important that individual voltage sources 14.1, 14.2, . . . 14.n are situated in series circuit 16. Battery system 12 according to the illustration in the drawing is associated with a battery charging controller 24.

Each of individual voltage sources 14.1, 14.2, . . . 14.n of battery system 12 has a bypass 18.1, 18.2, . . . 18.n. The particular individual voltage source 14.1, 14.2, . . . 14.n may be connected to bypasses 18.1, 18.2, . . . 18.n associated with each individual voltage source 14.1, 14.2, . . . 14.n. Either at least one resistor or at least one inductor may be serially situated in each of bypasses 18.1, 18.2, . . . 18.n for current limitation. In addition, a bypass switch 20.1, 20.2, . . . 20.n is associated with each of bypasses 18.1, 18.2, . . . 18.n. Furthermore, in the embodiment variant of the charge circuit illustrated in the drawing, a voltmeter 26 is contained in each bypass 18.1, 18.2, . . . 18.n. Instead of voltmeter 26 monitoring the particular voltage in individual voltage sources 14.1, 14.2, . . . 14.n, a sensor may also be associated with the particular individual voltage sources 14.1, 14.2, . . . 14.n which either measures the current flowing through the particular individual voltage source 14.1, 14.2, . . . 14.n or represents the current flowing through the particular individual voltage source 14.1, 14.2, . . . 14.n.

$I_L$ denotes the charge current transmitted by voltage source 10 to battery system 12. $I_{By,1\ldots n}$ identifies the current through bypasses 18.1, 18.2, . . . 18.n; $I_{Bz,1\ldots n}$ identifies the current established through the particular individual voltage source 14.1, 14.2, . . . 14.n.

Due to the configuration illustrated in the drawing of the charge circuit for charging battery system 12, voltage source 10 provided on the system side and connected to battery system 12 from the outside is used for obtaining a homogeneous charge distribution within battery system 12. No transformers are needed for transporting the charge to the particular individual voltage sources 14.1, 14.2, . . . 14.n; furthermore, the selection of individual voltage sources 14.1, 14.2, . . . 14.n for battery system 12 may be determined in a greater bandwidth, i.e., using a greater tolerance.

The homogeneous charge distribution due to the approach proposed according to the present invention is obtained by the fact that, when a bypass 18.1, 18.2, . . . 18.n is connected to the particular individual voltage source 14.1, 14.2, . . . 14.n, discharge of the particular individual voltage source 14.1, 14.2, . . . 14.n is avoided by regulating the intensity of bypass current $I_{By,1\ldots n}$ using timed control 24 of the particular bypass switch 20.1, 20.2, . . . 20.n. The regulation takes place in such a way that a mean current $\overline{I_{Bz,1\ldots n}}$ approximately equal to 0 results from individual voltage sources 14.1, 14.2, . . . 14.n.

The current regulation takes place according to the equation $$\overline{I_{Bz,1\ldots n}} = \overline{I_{By,1\ldots n}} - \overline{I_L} \approx 0$$

where:
$I_{By,1\ldots n}$=current over the individual voltage source bypass
$I_{Bz,1\ldots n}$=current through individual cells
$I_L$=charge current To detect a value approximately equal to 0 of current $I_{Bz,1\ldots n}$, on the one hand the voltage across individual voltage sources 14.1, 14.2, . . . 14.n may be detected with the aid of voltmeters 26. During the charging operation, the voltage across the particular individual voltage sources 14.1, 14.2, . . . 14.n may not exceed the maximum allowable limiting value. On the other hand, the current through the particular individual voltage sources 14.1, 14.2, . . . 14.n, denoted by $I_{Bz,1\ldots n}$, may also be detected using a sensor associated with one of the particular individual voltage sources 14.1, 14.2, . . . 14.n, which either measures or represents the current.

Bypasses 18.1, 18.2, . . . 18.n are activated at individual voltage sources 14.1, 14.2, . . . 14.n during the charging operation of battery system 12 by voltage source 10 situated on the outside when the voltage across the particular individual voltage sources 14.1, 14.2, . . . 14.n reaches the maximum allowable voltage value. In this case, those individual voltage sources 14.1, 14.2, . . . 14.n are fully charged and need no further charging by charge current $I_L$ supplied by voltage source 10. In contrast, those individual voltage sources 14.1, 14.2, . . . 14.n having lower charge conditions have not yet reached their maximum allowable voltage value and may be further charged by externally situated voltage source 10.

The charging operation is completed when either all individual voltage sources 14.1, 14.2, . . . 14.n or a previously defined number of individual voltage sources 14.1, 14.2, . . . 14.n has reached their maximum allowable voltage value.

To complete the charging operation, i.e., the supply of charge current $I_L$ by voltage source 10 into battery system 12, either the criterion "all cells" or the criterion "defined number of cells charged to the maximum allowable voltage value" may be used. This is a function of the application of the charge circuit proposed according to the present invention for battery system 12 or of the allowable power loss which may be removed by the bypass circuits.

To protect the bypass circuits, in particular bypass switches 20.1, 20.2, . . . 20.n, charge current $I_L$ through the voltage source or current source 10 may be limited via control by battery charging controller 24. The charge current limitation for charge current $I_L$ may be activated in particular when one or more of bypasses 18.1 18.2, . . . 18.n are activated. "A" denotes sensors for detecting the current in individual voltage sources 14.1 through 14.n, which may be used as an alternative to voltmeters 26. Resistors or inductors may be connected in series in respective bypasses 18.1 through 18.n; furthermore, bypass switches 20.1 through 20.n may be designed as semiconductor switches rather than as discrete switches.

An inhomogeneous charge distribution within individual voltage sources 14.1 14.2, . . . 14.n within battery system 12 may be avoided via the device for charging battery system 12 proposed according to the present invention.

What is claimed is:

1. A device for charging a battery system using a charging voltage source, the battery system having a plurality of individual voltage sources arranged in a series circuit, the device comprising:
   a plurality of bypasses assigned to the corresponding plurality of individual voltage sources in the battery system, wherein a charge current from the charging voltage source is supplied to the individual voltage sources via the corresponding individual bypasses as a function of the charge condition of the individual voltage sources; and
   a battery charging controller configured to provide a timed control of the plurality of bypasses for regulating the intensity of the current flowing through the plurality of voltage sources in the battery system.

2. The device as recited in claim 1, wherein at least one resistor connected in series with each bypass.

3. The device as recited in claim 1, wherein at least one inductor is connected in series with each bypass.

4. The device as recited in claim 1, wherein the regulation of the current flowing through the plurality of voltage sources provides a substantially zero mean current through the plurality of voltage sources, and wherein the mean current through the plurality of voltage sources is equal to a mean current through the plurality of bypasses minus the charge current.

5. The device as recited in claim 1, wherein each individual voltage source in the battery system is assigned a corresponding volt meter.

6. The device as recited in claim 1, wherein each individual voltage source in the battery system is assigned a current sensor.

7. A method for charging a battery system using a charging voltage source, the battery system having a plurality of individual voltage sources arranged in a series circuit, comprising:
providing a plurality of bypasses assigned to the corresponding plurality of individual voltage sources in the battery system, wherein a charge current from the charging voltage source is supplied to the individual voltage sources via the corresponding individual bypasses as a function of the charge condition of the individual voltage sources; and
providing a timed control of the plurality of bypasses for regulating the intensity of the current flowing through the plurality of voltage sources in the battery system, wherein the regulation of the current flowing through the plurality of voltage sources provides a substantially zero mean current through the plurality of voltage sources.

8. The method as recited in claim 7, wherein the mean current through the plurality of voltage sources of the battery system is equal to a mean current through the plurality of bypasses minus the charge current.

9. The method as recited in claim 7, further comprising:
monitoring the voltages established in the individual voltage sources of the battery system.

10. The method as recited in claim 9, wherein at least one selected bypass is activated during the charging operation when the voltage across a voltage sources corresponding to the selected bypass reaches a predefined maximum allowable voltage value.

11. The method as recited in claim 9, wherein the charging operation is terminated when a predetermined number of individual voltage sources in the battery system have reached respective predefined maximum allowable voltage values.

12. The method as recited in claim 9, wherein the charge current is limited to a predefined value when at least one bypass is activated.

* * * * *